United States Patent [19]
Laurent et al.

[11] Patent Number: 6,132,539
[45] Date of Patent: Oct. 17, 2000

[54] METHOD FOR MANUFACTURING PACKAGING MATERIALS WITH A POLYOLEFIN FOAM LAYER

[75] Inventors: Jacques Laurent, Blonay; Michel Pittet, Lussy, both of Switzerland

[73] Assignee: Convenience Food Systems, En Bakel, Netherlands

[21] Appl. No.: 08/875,870

[22] PCT Filed: Feb. 2, 1996

[86] PCT No.: PCT/CH96/00041

§ 371 Date: Nov. 24, 1997

§ 102(e) Date: Nov. 24, 1997

[87] PCT Pub. No.: WO96/25290

PCT Pub. Date: Aug. 22, 1996

[30] Foreign Application Priority Data

Feb. 17, 1995 [CH] Switzerland ............................ 0465/95

[51] Int. Cl.$^7$ ............................ B29C 47/06; B32B 31/30

[52] U.S. Cl. ................ 156/78; 156/244.24; 156/244.27; 264/46.1; 264/46.5; 264/171.23

[58] Field of Search ................................. 156/78, 244.11, 156/244.22, 244.24, 244.27; 264/45.9, 46.4, 46.5, 171.17, 171.23, 173.11, 173.18, 176.1, 46.1; 428/317.7, 318.6, 319.7

[56] References Cited

U.S. PATENT DOCUMENTS

| | | | |
|---|---|---|---|
| 4,126,262 | 11/1978 | Thompson et al. | 229/17 G |
| 4,440,824 | 4/1984 | Bonis | 428/216 |

FOREIGN PATENT DOCUMENTS

| | | |
|---|---|---|
| 0 344 726 | 12/1989 | European Pat. Off. . |
| 0 456 890 | 11/1991 | European Pat. Off. . |
| 0 570 222 | 11/1993 | European Pat. Off. . |
| 2 388 659 | 11/1978 | France . |
| 37 22 139 | 1/1989 | Germany . |
| 90/04517 | 3/1990 | WIPO . |

*Primary Examiner*—Blaine Copenheaver
*Attorney, Agent, or Firm*—Oppedahl & Larson LLP

[57] ABSTRACT

A method in which a polyolefin foam layer is laminated to a sealing film having at least a first layer of a polyolefin. During the lamination a second layer is located between the first layer and the foam layer; the second layer is extruded therebetween and pressure is immediately applied. The second layer and the first layer are polyolefins each based on the same monomer as the main monomer of the foam layer. The same lamination technique may be used to laminate a sealing film to the other side of the foam layer, optionally at the same time as the lamination of the sealing film to the first side of the foam layer. Alternatively, the lamination technique may be used on one side of the foam layer, and the other side of the foam layer may be sealed by means of a coextruded layer.

20 Claims, 2 Drawing Sheets

METHOD FOR MANUFACTURING PACKAGING MATERIALS WITH A POLYOLEFIN FOAM LAYER

The invention is in the field of the packaging industry and relates to a method according to the generic part of the independent claim and to packaging materials produced according to the inventive method. The method serves for manufacturing packaging materials consisting of a polyolefin foam layer which is coated with a coating film on at least one side.

Packaging materials with a foam layer of e.g. polypropylene, in the form of quasi endless, rolled webs are used for producing thermoformed, self supporting packaging items as e.g. trays for food, which trays are, after filling e.g. closed with a transparent film. Such materials are applicable in the so called "Form-Fill-Seal" packaging method (FFS-method). For this method the packaging material is fed into an apparatus in which it is formed into a web of trays, which trays in the same apparatus are filled, sealed with a sealing film and then are separated from each other.

In these packaging materials the polypropylene foam layer is coated either on one side or on both sides with a coating film. The foam layer renders the packaging item stiff and the coating film basically closes the pores of the foam layer in order to make it tight and to prevent liquid from entering into the inside of the foam material. Depending on the composition and thickness of the coating film, this film may also serve as a further means for increasing the stiffness, as protection of the foam surface and/or as gas and aroma barrier. Usually the coating film carries on its surface facing away from the foam layer a sealing layer which serves as a bonding layer between the packaging material and a transparent film used for closing the packaging item (tray).

Packaging materials with a polypropylene foam layer for producing trays by thermoforming are described e.g. in the publication EP-A1-0570222. The described materials are manufactured by thermobonding (lamination by application of heat and pressure) to a sheet of a polypropylene foam, a multilayer film, which multilayer film includes a barrier layer rendering the packaging material gas- and/or aroma-tight. This multilayer film needs a bonding layer facing the foam sheet which bonding layer has to consist of a material capable of adhesion to the foam sheet in the thermobonding process, i.e. when exposed to heat and pressure. The heat which may be used for the bonding is limited by the polypropylene foam which is to be laminated without change to its structure by the heat applied. This means that the bonding layer of the coating film needs to be made of a polymer plasticating at a considerably lower temperature than polypropylene, e.g. an ethylene copolymer.

The low melting bonding layer renders the whole structure rather thermo-sensitive and represents a foreign material regarding the recyclability of the polypropylene material. Furthermore it renders the choice of materials for the foam layer rather narrow because there has to exist a material for the bonding layer plasticating at a lower temperature than the foam material and still satisfying the minimal demand on thermal stability which is posed on the packaging items made from the packaging material. Furthermore the demands on the material of the bonding layer render the coating film structure complicated as can be seen from the example given in the above mentioned publication.

In the publication EP-344726 similar packaging materials are described, which packaging materials consist substantially of a foamed plastic (e.g. polypropylene) coating on one or both sides. For producing the material adhesion methods (as EP-0570222) are proposed or coextrusion methods. For the coextrusion method, the foamed layer is coextruded with additional layers either of the same plastic material as the foamed material or of a different plastic material.

It is the object of the invention to create a method for manufacturing packaging materials with a polyolefin foam layer applicable for forming self supporting packaging items such as trays for food packaging, which method allows to omit a bonding layer with a substantially lower thermostability than the foam layer has. Using the inventive method allows therefore a larger choice of polyolefins for the foam layer than do known such methods. The packaging material produced by the method is to contain less material different from the foam material than known such packaging materials do. The method can be less expensive than known methods for manufacturing packaging materials with a polyolefin foam layer usable for the same purposes.

The above objects are achieved by the method for producing packaging materials with a polyolefin foam layer as defined by the patent claims.

The inventive method is based on an extrusion lamination step for coating the polyolefin foam layer.

Thereby a foam sheet produced in a separate method step by extrusion and expansion is coated by extrusion lamination with a single-layer or a multilayer coating film produced in a separate method step by coextrusion. This means that the polyolefin foam sheet and the coating film are guided together and a further bonding layer is extruded between them. This further bonding layer extruded in the extrusion lamination step consists of a polyolefin based on the main monomer of the foam layer. Immediately after the extrusion of the further bonding layer, there is sufficient pressure applied to the composition to achieve a satisfactory bond without impairing the foam layer. The coating film needs a bonding layer facing towards the foam layer (or rather toward the further bonding layer) which consists of a polyolefin based on the monomer which is the same monomer as the main monomer of the polyolefin of the foam layer (e.g. propylene). This bonding layer again may be the only layer of a single layer coating film or it may be the innermost layer of a multilayer coating film.

The packaging material produced according to the inventive method always shows on the surface of the foam layer two layers of basically the same polyolefin as the polyolefin of the foam layer.

If the foam layer is to be coated on both sides, this can be done by producing the foam sheet and the two coating films in separate method steps and by coating the foam layer in two extrusion lamination steps. It can further be done by producing a foam layer coated on one side by coextrusion and coat this layer on the other side by extrusion lamination with a coating film produced in a separate coextrusion or extrusion step. In all cases on the coated surface of the polyolefin foam layer there are two layers of basically the same polyolefin as the polyolefin of the foam layer.

The inventive method and packaging materials produced with the inventive method are described in more detail in connection with the following Figures. Wherein.

The examples described in connection with the Figures all concern packaging materials with a polypropylene foam layer. This does not limit the inventive method to the production of polypropylene based packaging materials. The same method may be applied for producing polyethylene based materials or materials based on other polyolefins.

Figure 1:
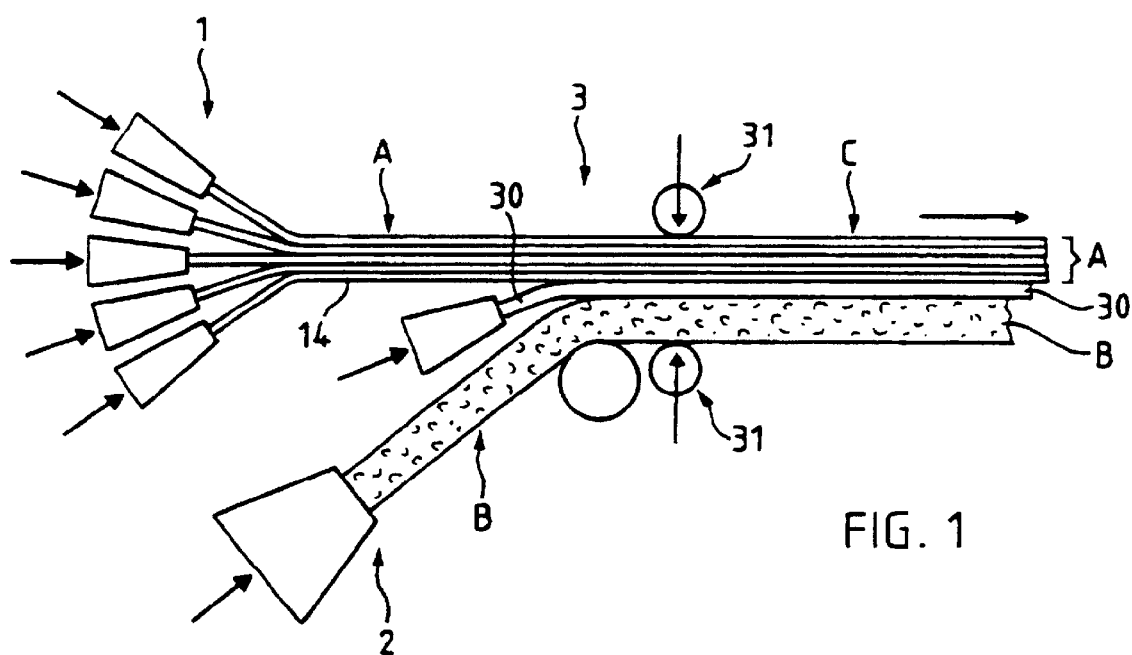
FIG. 1 shows schematically an exemplified embodiment of the inventive method for producing by extrusion lamination a packaging material coated on one side with a multilayer coating film.

FIG. 1 shows schematically an exemplified embodiment of the inventive method with three method steps 1, 2 and 3. Method step 1 is a coextrusion or extrusion step in which the multilayer (e.g. five-layer) or single layer coating film A is produced. Method step 2 is an expansion and extrusion step in which the polyolefin sheet B is produced. Method step 3 is an extrusion lamination step in which the final packaging material C is produced by extruding a polyolefin bonding layer 30 between the foam sheet B and the coating film A and applying enough pressure to the product (e.g. by pressing rolls 31) to achieve a satisfactory bond.

The foam sheet B produced in method step 2 consists of a foamed polyolefin. For forming self-supporting packaging items such as trays, applicable in food packaging, foamed polypropylene is used advantageously, as it is self-supporting and need not be too thick nor too dense. A mixture of polypropylene with long chain branching (high melt strength polypropylene) and a propylene-ethylene-copolymer (e.g. heterophasic block propylene-ethylene-copolymer) expanded with the help of a solid or a gaseous blowing agent result in a packaging material which is thermoformable but, thanks to its reduced brittleness, is formable into packaging items such as trays by folding also. Very good results are achieved with a mixture with equal parts of the two polymers and with an addition of two percent of a solid blowing agent.

Polypropylene foam sheets for the application in packaging materials for forming self supporting packaging items have preferably a thickness of 0.5 to 2 mm and a density of 0.1 to 0.8 g/cm$^3$, preferably of 0.3 g/cm$^3$, and a cell count of 100 to 300 cells per mm$^3$. Density and cell count can be influenced by changing the extrusion pressure and other process conditions.

The polyolefin extruded in method step 3 is to be based on the same monomer as the main monomer of the foam layer. In case of the above described foam being made of a mixture of polypropylene and a polypropylene copolymer it is preferably polypropylene. The extruded bonding layer advantageously has a thickness of 5 to 30 μm.

The coating film A produced in the method step 1 is to have at least one surface (e.g one surface layer 14) consisting of a polyolefin based on a monomer which is the same as the main monomer of the foam layer, preferably the same polyolefin as the one extruded in method step 3. This one surface of the coating film is to face the foam sheet in method step 3. Examples of different coating films are described in connection with FIGS. 3 to 5.

The third method step may be repeated for coating the other surface of the foam layer also, whereby the coating films on the two sides of the foam layer may be similar or different from each other.

It is possible to carry out the second and the third method step within the same apparatus, coating the foam layer within seconds after its leaving the extrusion die.

Figure 2:
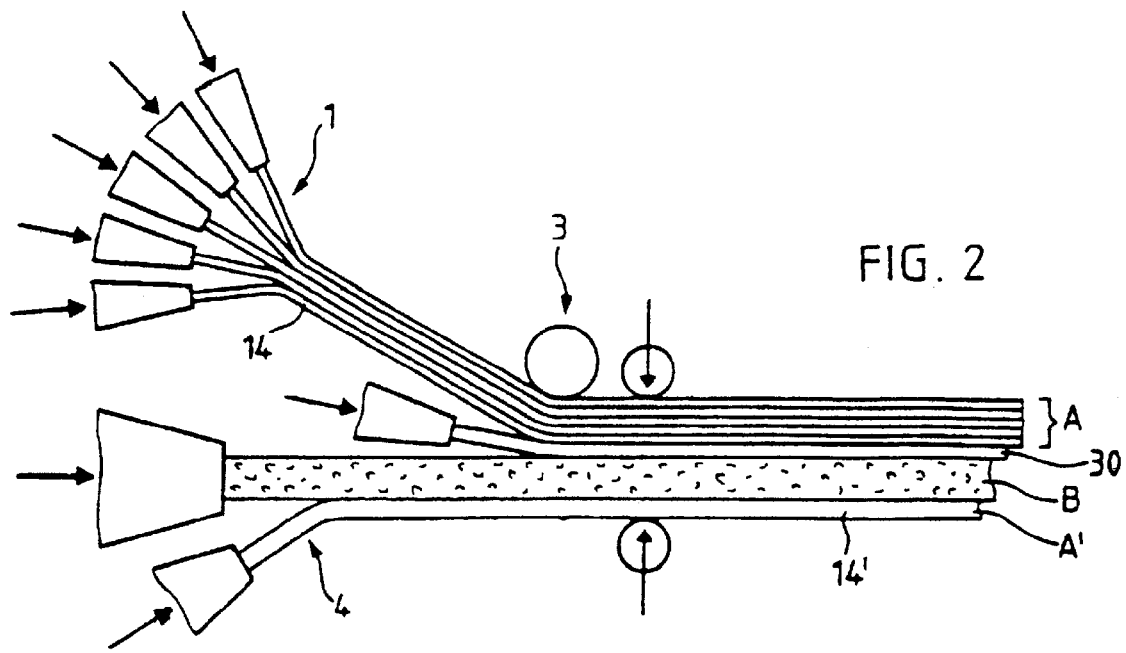
FIG. 2 shows schematically an exemplified embodiment of the inventive method for producing by coextrusion and extrusion lamination a packaging material coated on one side with a multilayer and on the other side with a single-layer coating film.

FIG. 2 shows a further exemplified embodiment of the inventive method, containing a coextrusion step 4 for coating the one side of a foam layer B with a single-layer coating film A' and an extrusion lamination step 3 for coating the other side of the foam layer B with a multilayer coating film A.

Figure 3:
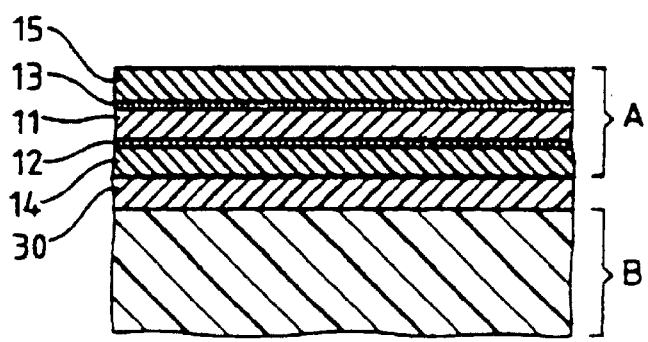
FIGS. 3 to 5 show cross sections through exemplified coatings of packaging materials produced by the inventive method.
Figure 4:
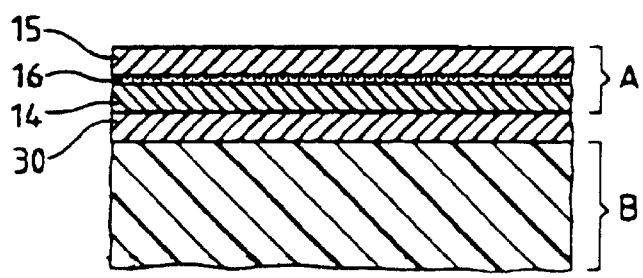
Figure 5:
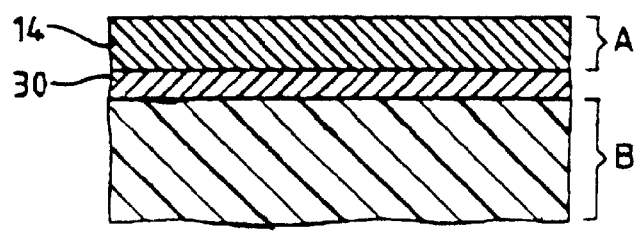

FIGS. 3 to 5 show in cross section exemplified coatings of foam layers producable with the inventive method. All the shown coatings are produced with an extrusion lamination step and therefore all show in addition to the bonding layer 14 being part of the coating film a further bonding layer 30 extruded in the extrusion lamination step.

FIG. 3 shows a cross section through an exemplified packaging material produced by the inventive method. The packaging material consists of the three basic components: the coating film A, the foam layer B and the further bonding layer 30 extruded in method step 3 (FIG. 1) between foam layer B and coating film A.

The five-layer coating film shown in FIG. 3 consists of a barrier layer 11 made e.g. of ethylene-vinyl-alcohol-copolymer, adhesive layers 12 and 13 on either side of the barrier layer 11, a bonding layer 14 facing the extruded further bonding layer 30 and a sealing layer 15 e.g. consisting of low density polyethylene or peelable polyethylene which is bondable to film material with which the packaging item, e.g. tray, is to be covered for closing. The sealing layer 15 may be replaced by a protection layer without sealing function, e.g. made of polypropylene like the bonding layer 14. Packaging material with such a protecting layer may be used for packaging items which do not require heat sealing for closing.

The adhesive layers 12 and 13 consist of an adhesive suitable for bonding ethylene-vinyl-alcohol-copolymer. For the illustrated case the first adhesive layer 12 bonding the barrier layer 11 to the bonding surface layer 14 (polypropylene) consists of a propylene-copolymer, the second adhesive layer 13 bonding the barrier layer 11 to the sealing layer 15 (polyethylene) consists of an ethylene-copolymer.

Advantageous thicknesses for the different layers in the packaging material as shown in FIG. 3 are: sealing layer 15: 10–50 μm, adhesive layers 12 and 13: 3–5 μm, barrier layer 11: up to 10 μm, bonding layer 14: 5–15 μm, extruded further bonding layer 30: 5 to 30 μm and foam layer B: 0.5–2 mm.

FIG. 4 shows a cross section through a further exemplified coating of a packaging material produced with the inventive method. The basic components are as in FIG. 3: polypropylene foam layer B, polypropylene extruded further bonding layer 30 and coating film A. The coating film contains three layers: polypropylene bonding layer 14, sealing layer 15 and, if necessary an adhesive layer 16 in-between.

FIG. 5 shows a cross section of a further exemplified coating of a packaging material produced with the inventive method. The coating film A of this material is an extruded single-layer film consisting of polypropylene, serving both as bonding layer 14 and as protecting layer.

FIGS. 3 to 5 all show only one coated surface of a foam layer. The other surface of the foam layer is either uncoated or coated, wherein all combinations of the three shown or of other similar coatings are thinkable.

What is claimed is:

1. A method for producing a packaging material usable for forming self-supporting packaging items, which packaging material has the form of a quasi-endless rollable web, the method comprising the steps of:

producing by expansion and extrusion a foam sheet of a first polyolefin, said foam sheet having first and second sides;

producing by extrusion or coextrusion a first coating film comprising at least one surface layer of a second polyolefin;

producing by extrusion, between the first side of the foam sheet and the surface layer of the first coating film, a first bonding layer of a third polyolefin, and immediately after extrusion of the first bonding layer, applying pressure to the foam sheet, the first coating film, and the first bonding layer all together;

wherein the first, second, and third polyolefins are all based on a same main monomer;

yielding the foam layer of the first polyolefin coated on at least one side with the first coating film.

2. The method of claim 1 wherein the first coating film further comprises at least a second layer coextruded with the surface layer.

3. The method of claim 1 wherein the first bonding layer has a thickness of between 5 and 30 µm.

4. The method of claim 1 further comprising the steps of:
producing by extrusion or coextrusion a second coating film comprising at least one surface layer of a fourth polyolefin;
producing by extrusion, between the second side of the foam sheet and the surface layer of the second coating film, a second bonding layer of a fifth polyolefin, and immediately applying pressure to the foam sheet and the second coating film;
wherein the fourth and fifth polyolefins are all based on the same main monomer as that of the first, second, and third polyolefins;
yielding the foam layer of the first polyolefin coated on one side with the first coating film and on the other side with the second coating film.

5. The method of claim 4 in which the steps of applying pressure are performed with respect to the foam sheet, the first coating film, and the second coating film all together.

6. The method of claim 4 in which the step of applying pressure with respect to the foam sheet and the second coating film is performed after the step of applying pressure with respect to the foam sheet and the first coating film.

7. The method of claim 4 wherein the second coating film further comprises at least a second layer coextruded with the surface layer.

8. The method of claim 4 wherein the second bonding layer has a thickness of between 5 and 30 µm.

9. The method of claim 1 wherein the foam sheet has been coated on its second side in a coextrusion step preceding the step of applying pressure.

10. The method of claim 1 wherein the monomer of the polyolefin of the foam sheet is propylene.

11. The method of claim 1 wherein the step of producing by extrusion or coextrusion a first coating film comprising at least one surface layer of a second polyolefin, further comprises coextruding a sealing layer of polyethylene with the surface layer of the second polyolefin, with an adhesive layer between the sealing layer and the surface layer, the second polyolefin comprising polypropylene.

12. The method of claim 1 wherein the polyolefin used for the production of the foam sheet is a mixture of long chain branching polypropylene and an ethylene-propylene copolymer.

13. The method of claim 1 wherein the first coating film further comprises a sealing layer of polyethylene, and between the surface layer of the second polyolefin and the sealing layer of polyethylene a barrier layer of ethylene-vinyl-alcohol-copolymer, and between the barrier layer and the surface layer of the second polyolefin a first adhesive layer of a propylene copolymer, and between the barrier layer and the sealing layer a second adhesive layer of an ethylene copolymer.

14. The method of claim 1 wherein the first coating film further comprises a protecting layer of polypropylene, and between the surface layer of the second polyolefin and the protecting layer of polypropylene a sealing layer of ethylene-vinyl-alcohol-copolymer, and between the sealing layer and the surface layer of the second polyolefin a first adhesive layer of a propylene copolymer, and between the protecting layer and the sealing layer a second adhesive layer of a propylene copolymer.

15. A method of manufacturing a packaging material, said method for use with a foam sheet of a first polyolefin, said foam sheet having first and second sides, and with a first coating film comprising at least one surface layer of a second polyolefin, the method comprising the steps of:
producing by extrusion, between the first side of the foam sheet and the surface layer of the first coating film, a first bonding layer of a third polyolefin, and immediately after extrusion of the first bonding layer, applying pressure to the foam sheet, the first coating film, and the first bonding layer all together;
wherein the first, second, and third polyolefins are all based on a same main monomer;
yielding the foam layer of the first polyolefin coated on at least one side with the first coating film.

16. The method of claim 15, further characterized as being for use with a second coating film comprising at least one surface layer of a fourth polyolefin, said method further comprising the steps of:
producing by extrusion, between the second side of the foam sheet and the surface layer of the second coating film, a second bonding layer of a fifth polyolefin, and immediately applying pressure to the foam sheet and the second coating film;
wherein the fourth and fifth polyolefins are all based on the same main monomer as that of the first, second, and third polyolefins;
yielding the foam layer of the first polyolefin coated on one side with the first coating film and on the other side with the second coating film.

17. The method of claim 15 wherein the foam sheet has been coated on its second side in a coextrusion step preceding the step of applying pressure.

18. A method of manufacturing a foam laminate comprising a foam sheet of a first polyolefin and a first coating film comprising at least one surface layer of a second polyolefin, the method comprising the steps of:
producing by extrusion, between the first side of the foam sheet and the surface layer of the first coating film, a first bonding layer of a third polyolefin, and immediately after extrusion of the first bonding layer, applying pressure to the foam sheet, the first coating film, and the first bonding layer all together;
wherein the first, second, and third polyolefins are all based on a same main monomer; yielding the foam layer of the first polyolefin coated on at least one side with the first coating film.

19. The method of claim 18, further characterized as being for use with a second coating film comprising at least one surface layer of a fourth polyolefin, said method further comprising the steps of:
producing by extrusion, between the second side of the foam sheet and the surface layer of the second coating film, a second bonding layer of a fifth polyolefin, and immediately applying pressure to the foam sheet and the second coating film;
wherein the fourth and fifth polyolefins are all based on the same main monomer as that of the first, second, and third polyolefins;
yielding the foam layer of the first polyolefin coating on one side with the first coating film on the other side with the second coating film.

20. The method of claim 18 wherein the foam sheet has been coated on its second side in a coextrusion step preceding the step of applying pressure.

* * * * *